(12) United States Patent
Jones et al.

(10) Patent No.: US 6,763,001 B1
(45) Date of Patent: Jul. 13, 2004

(54) DISCOVERING NON MANAGED DEVICES IN A NETWORK SUCH AS A LAN USING TELNET

(75) Inventors: Paul Robert Jones, Barton Le Clay (GB); Daniel Ginger, Hemel Hempstead (GB); Mitchell James Warner, Hemel Hempstead (GB)

(73) Assignee: 3Com Corporation, Santa Clara, CA (US)

( * ) Notice: Subject to any disclaimer, the term of this patent is extended or adjusted under 35 U.S.C. 154(b) by 755 days.

(21) Appl. No.: 09/641,146

(22) Filed: Aug. 17, 2000

(30) Foreign Application Priority Data

Apr. 12, 2000 (GB) .............................. 0009044

(51) Int. Cl.[7] .............................. H04L 12/28
(52) U.S. Cl. .................................... 370/254
(58) Field of Search .............................. 709/224, 220, 709/223; 370/254, 255

(56) References Cited

U.S. PATENT DOCUMENTS

| | | | |
|---|---|---|---|
| 5,907,696 A | * | 5/1999 | Stilwell et al. ............. 709/224 |
| 6,011,915 A | | 1/2000 | Aaker et al. ........... 395/500.44 |
| 6,360,260 B1 | * | 3/2002 | Compliment et al. ....... 709/220 |
| 6,405,248 B1 | * | 6/2002 | Wood ......................... 709/223 |
| 6,611,863 B1 | * | 8/2003 | Banginwar .................. 709/220 |

* cited by examiner

Primary Examiner—Kenneth Vanderpuye
(74) Attorney, Agent, or Firm—Michaelson & Associates; Peter L. Michaelson; Alberta A. Vitale

(57) ABSTRACT

In a computer network, a method for obtaining information regarding a device in a network, including obtaining said information using Telnet and using said information in the discovery of a network.

The method uses a computer program on a computer readable medium loadable into a digital computer or embodied in a carrier wave.

Said program comprising of the steps of, in respect of a device, creating a socket; connecting said socket to a Telnet port on said device; if connection was not successful, displaying the device as a generic device on a network map; if connection was successful, reading the login banner data; if the data did not read OK, display the device as a generic device on network map; if the data did read OK, parse the login banner data to obtain type; and use information to obtain device type ID and display relevant device on network map.

6 Claims, 1 Drawing Sheet

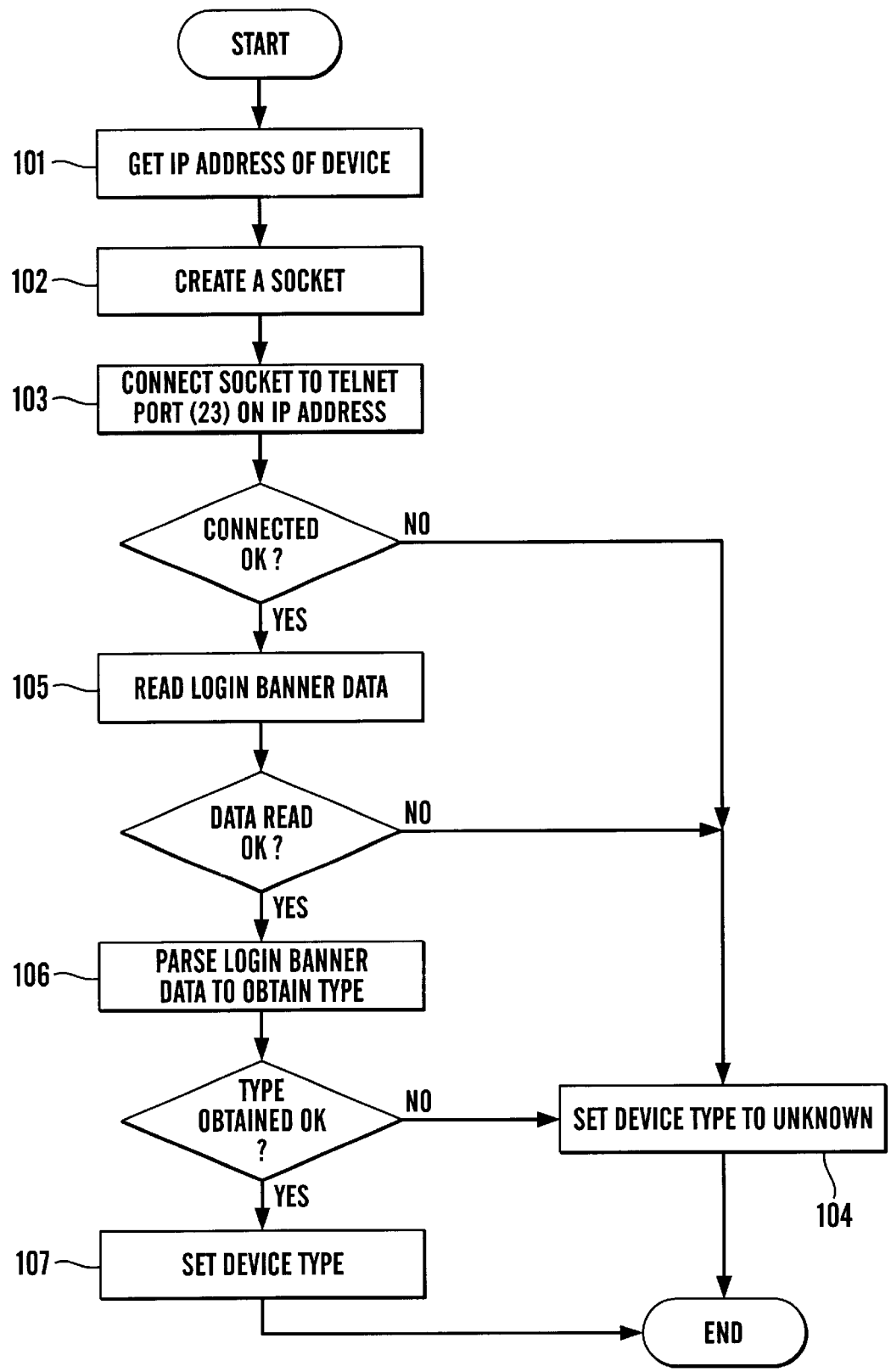

DISCOVERING NON MANAGED DEVICES IN A NETWORK SUCH AS A LAN USING TELNET

BACKGROUND OF THE INVENTION

The present invention relates to a method and apparatus for discovering non managed devices (e.g. devices that do not have an SNMP (Simple Network Management Protocol) agent) in a network such as a LAN (Local Area Network) or other network using Telnet.

The present, invention relates to the process of discovery of the devices on a network, that is a network of electronic devices comprising, for example, workstations, personal computers, servers, hubs, routers, bridges, switches, (hereinafter referred to as devices of the network), and links between these devices which may be in the form of physical cable or wireless links. The network may be a local area network (LAN), such as an Ethernet network, wide area network (WAN) or other types, including wireless networks.

Computers and other devices connected to a network may be managed or unmanaged devices. A managed device has processing capability, which enables it to monitor data traffic sent from, received at, and passing through the ports of the device. Monitored data associated with the ports of the network device is stored in memory on the network device. For example, data relating to the origin of a data packet which is received at a port is stored along with the identity of the relevant port.

After such a network has been installed, it is desirable for the person appointed network manager to be able to understand the technical operation of the network.

The topology of the network may be deduced by the network manager's computer by the process of discovery in which each of the devices of the network is interrogated to thereby produce on a network manager's workstation details of the network and its operation, preferably in the form of a network map which may be displayed on a visual display unit showing the devices and links between the devices. At its simplest, and where the device is a "managed" device, this information is usually provided by interrogation using a known protocol, such as the SNMP (Simple Network Management Protocol), of the so-called 'agent' of each device which stores the device's unique MAC address, the type of device and the MAC addresses embedded in the data passing into a particular port which thereby gives the MAC addresses of the origin of the data and hence the MAC address of the devices which are connected to the ports directly or indirectly.

Many devices are not SNMP enabled and so the discovery or interrogation of the network produces a result in which these non SNMP enabled devices are displayed as "generic" devices.

It would be desirable if one were able to deduce more information about these generic devices, that is non-SNMP enabled devices, and the present invention provides a method of doing so.

SUMMARY OF THE INVENTION

The present invention provides a method for obtaining information regarding a device in a network, said method including obtaining said information using Telnet and using said information in the discovery of a network.

The present invention also provides a computer program on a computer readable medium loadable into a digital computer or embodied in a carrier wave, said program including software for carrying out the method of the preceding paragraph.

The present invention also provides a computer program on a computer readable medium loadable into a digital computer or embodied in a carrier wave for obtaining information regarding devices in a network, said program comprising:

in respect of a device, creating a socket;

a program step to connect said socket to a Telnet port on said device;

if connection was not successful, display the device as a generic device on a network map;

if connection was successful, read login banner data;

if data did not read OK, display device as generic device on network map;

if data did read OK, parse login banner data to obtain type;

use information to obtain device type ID and display relevant device on network map.

BRIEF DESCRIPTION OF THE DRAWINGS

A preferred embodiment of the invention will now be described by way of example only and with reference to the accompanying drawing which is a flow chart of a method of discovery of devices on a network, which method includes steps for discovering devices which support Telnet but are not SNMP enabled devices.

DESCRIPTION OF THE PREFERRED EMBODIMENTS

The physical network to be discovered may comprise a plurality of devices in the form of a network supervisor's workstation or computer, other workstations, hubs, or switches.

The devices are connected together by means of links which may be hard wired or wireless and utilise any desired protocol.

The network supervisor's workstation includes, in addition to a visual display unit, a central processing unit or signal processor, a selector which may be in the form of a mouse, a program store which may comprise, for example, a CD drive, a floppy disk drive or a zip drive, and a memory for storing a program which may have been loaded from the program store or downloaded for example via Internet from a website.

To discover the network, using SNMP, the network supervisor's computer interrogates each device and analyse the network, and stores in the memory the information relating to the devices within the network and the links between the devices. In essence, managed devices include a so-called agent which in the case of an SNMP agent stores information about the device such as its unique MAC address, its sysObject ID (which identifies what the device is and its model type), how many ports it has, and the MAC address of the origin of the data which at least some of the ports have received and hence to which they are directly or indirectly connected. The computer interrogates the agents of each device.

In a preferred arrangement, the computer may, on command from the selector, process signals from the memory by the signal processor and provide on the visual display unit a network map showing each of the devices and the links therebetween. In the examples described, the network is simple but of course in many instances the network will be considerably more complex and it may be necessary to arrange that the visual display unit only shows a simplified version or only part of the network at any one time.

As mentioned above, however, whilst many devices may support (ie communicate using) the SNMP protocol and hence will be discovered and represented by the relevant icon in its correct location on the network map, some devices do not support the SNMP protocol. Examples of such devices are UNIX workstations, printers and print servers. Thus discovering the network using SNMP (or indeed any other related protocol) will mean that these devices will appear as icons representing unmanaged generic devices, in other words, the SNMP protocol will not allow for proper discovery of the identity of these devices. The inventors of this invention have invented an alternative method of identifying these non-SNMP enabled devices and providing relevant details by using a different protocol, ie not SNMP.

Some or all of the devices which are not SNMP enabled will support a protocol Telnet. Telnet is a user command protocol for accessing remote computers. It allows one to log on as a regular user with relevant access to applications and data on that computer.

In use, when a user (client) accesses a computer via Telnet, the server device sends a Login prompt to the client computer so that the client computer can display the Login prompt to the user. This Login prompt usually contains a banner identifying the machine name, its operating system, and version.

This information is sent to the client computer without the client computer having to provide any Login identification details which essentially means that the client computer only has to connect to the Telnet server port via a socket to obtain the Login banner.

The present invention relates to an arrangement in which devices are identified if they support Telnet where a Telnet Login banner has an identification string, for example, printers or print servers.

The present application, therefore, uses this arrangement to provide the relevant information when the device is non-SNMP enabled. Once the client computer, or the network manager's computer in this case, determines that the device is not SNMP enabled, it accesses the relevant device via Telnet to try to obtain a Login banner. It does this by opening a socket with the Telnet server port on the relevant device. Once obtained, the Login banner is parsed to determine the operating system. The operating system is determined by comparing the parsed data with a known set of operating system name strings, where a match results in its type being determined.

Thus different types of Login banner may be provided by different devices and it is necessary for the network manager's computer to have a "master" set of operating system name strings to match the name strings returned with the Login banner with a relevant type.

Having deduced the identification information of the device, the network manager's computer is then able to produce a network map on which the device is identified with the relevant information. For example, that information may set out what the device is (work station, printer, etc), and what model of device it is (that is the manufacturer and model number), and such other information as may be useful.

The preferred method of the invention is carried out under the control of the network manager's workstation or computer and in particular by means of a program controlling the processor apparatus of that computer or elsewhere in the system.

The program for controlling the operation of the invention may be provided on a computer readable medium, such as a CD, or a floppy disk, or a zip drive disk carrying the program or their equivalent, or may be provided on a computer or computer memory carrying the website of, for example, the supplier of the network products. The program may be downloaded from whichever appropriate source and used to control the processor to carry out the steps of the invention as described.

The program may include an algorithm of the form set out in the flow chart of the drawing.

Thus the program may include the following steps (only the numbered steps are illustrated in the drawing):

program step 101, get IP address of device;
program step, cause the network manager's computer to ping the device;
program step to receive sysObjectID from pinged device;
program step, was obtaining sysObjectID successful?
if obtaining sysObjectID was successful, (i.e. the device supports SNMP), identify the
device type based on sysObjectID and display device type on network map;
if obtaining sysObjectID was unsuccessful, at program step 102, create a socket;
at program step 103, connect socket to Telnet port (23) on device;
if connection in step 103 was not successful (device does not support Telnet) at step 104 display device as generic device on network map,
if connection in step 103 was successful, at program step 105 read login banner data,
if, at step 105, data read did not read OK, at program step 104 display device as generic device on network map;
if, at step 105, data did read OK, at program step 106, parse login banner data to obtain type;
if, at step 106, type not obtained, at program step 104, display generic type device on network map;
if, at step 106, type was obtained, at program step 107, use information to obtain device type ID and display relevant device on network map.

The invention is not restricted to the details of the foregoing example.

What is claimed is:

1. A method for obtaining information regarding a type of an unmanaged device in a network, said method including obtaining said information by parsing a Telnet login banner and using said information in the discovery of the network.

2. A method as claimed in claim 1 in which said information is information identifying the device.

3. A method as claimed in claim 1 including using said information to provide a relevant icon on a network map.

4. A computer program on a computer readable medium loadable into a digital computer or embodied in a carrier wave, said program including software for carrying out the method of any of claim 1.

5. A computer program on a computer readable medium loadable into a digital computer or embodied in a carrier wave for obtaining information regarding devices in a network, said program comprising:

in respect of a device, creating a socket;

a program step to connect said socket to a Telnet port on said device;

if connection was not successful, display the device as a generic device on a network map;

if connection was successful, read login banner data;

if data did not read OK, display device as generic device on network map;

if data did read OK, parse login banner data to obtain type;

use information to obtain device type ID and display relevant device on network map.

6. A method for obtaining information regarding devices in a network, said program comprising:

in respect of a device, creating a socket;

connecting said socket to a telnet port on said device;

if the connection was not successful, displaying the device as a generic device on a network map;

if the data did not read OK, displaying the device as a generic device on the network map;

if the data did read OK, parsing the login banner data to obtain the type; and using the information to obtain the device type ID and to display the relevant device on the network map.

* * * * *